T. E. MURRAY.
PROCESS OF ELECTRICALLY WELDING TRANSVERSE PLATES TO TUBES.
APPLICATION FILED DEC. 16, 1919.

1,350,833. Patented Aug. 24, 1920.
2 SHEETS—SHEET 1.

Inventor
Thomas E. Murray
By his Attorney

UNITED STATES PATENT OFFICE.

THOMAS E. MURRAY, OF BROOKLYN, NEW YORK.

PROCESS OF ELECTRICALLY WELDING TRANSVERSE PLATES TO TUBES.

1,350,833. Specification of Letters Patent. Patented Aug. 24, 1920.

Application filed December 16, 1919. Serial No. 345,173.

*To all whom it may concern:*

Be it known that I, THOMAS E. MURRAY, a citizen of the United States, residing at Brooklyn, in the county of Kings and State of New York, have invented a certain new and useful Improvement in Processes of Electrically Welding Transverse Plates to Tubes, of which the following is a specification.

The invention relates to a process of electrically welding transverse plates to the periphery of a tube. A product of said process is here shown embodied in a water tube steam boiler for the purpose of increasing the heat conducting surface of the tubes therein.

In the accompanying drawings—

Figure 1:
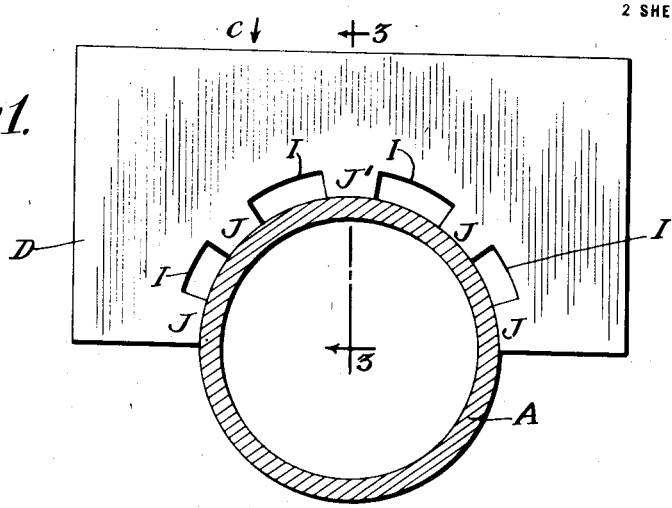
Figure 2:
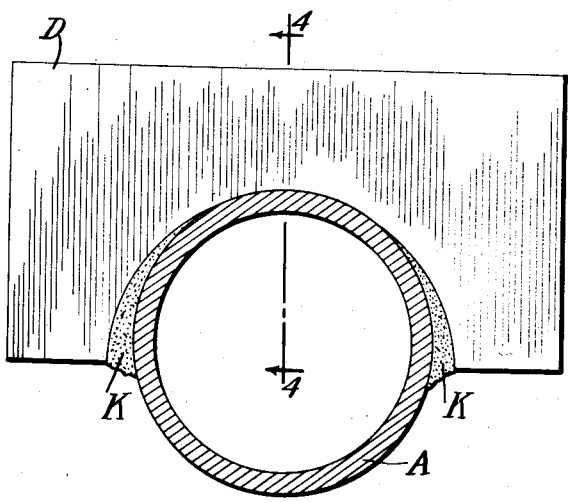
Figure 3:
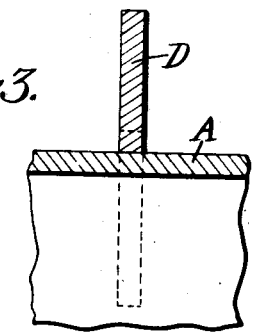
Figure 4:
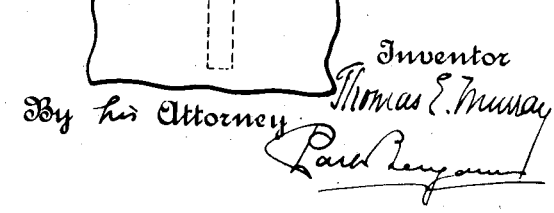
Figure 5:
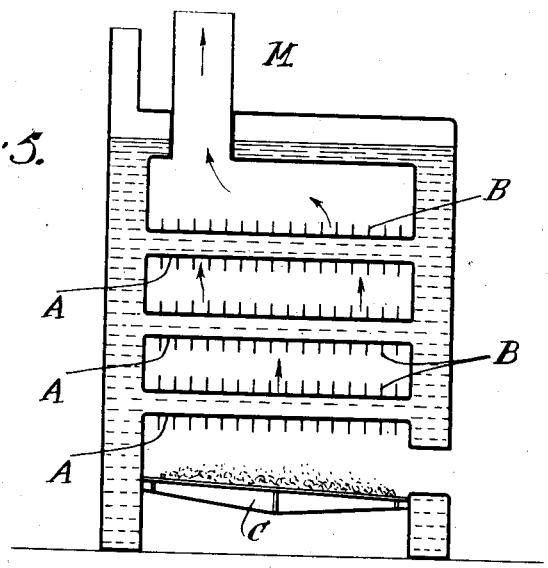
Figure 6:
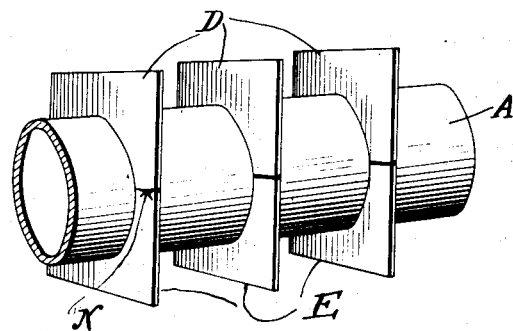
Figure 7:
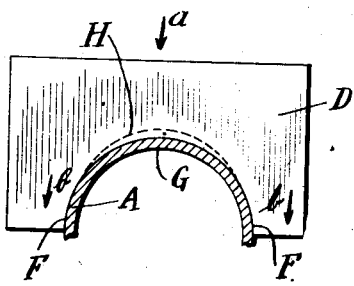

Figure 1 shows a conducting plate in elevation having a recess and projections therein applied transversely to a boiler tube (shown in section) before welding. Fig. 2 is a similar view, showing the tube and conducting plate after welding (part of the tube being broken away). Fig. 3 is a section on the line 3, 3 of Fig. 1. Fig. 4 is a section on the line 4, 4 of Fig. 2. Fig. 5 is a vertical section of a typical water tube boiler, showing the water tubes, and with the conducting plates thereon. Fig. 6 is a perspective view of a portion of one of the water tubes, with the conducting plates welded in place thereon. Fig. 7 is an illustrative diagram, showing current distribution welding.

Similar letters of reference indicate like parts.

It is desired to weld conducting plates transversely upon the tubes of a water tube boiler in order to increase the heat conducting surface of said tubes. In Fig. 5, I have illustrated a typical form of water tube steam boiler in which the tubes are shown at A, and at B the heating conducting plates thereon—said tubes, as usual, being disposed above the grate C, the products of combustion passing around and between them to the uptake M. In Fig. 6, I show a portion of one of the tubes A in perspective, with the conducting plates each formed in two half sections D, E, said sections being disposed transversely on the tube, and having the edge of a curved recess in each electrically welded to said tube.

Considering one of said half sections, as D, I find that certain difficulties present themselves when the effort is made to weld the curved edge of the plate to the surface of the tube. If the recess in the plate be struck with the same radius as the tube, while it will fit thereon at the outset, the establishment of the welding current and the pressure exerted upon the plate in its own plane to force it against the tube results in an unequal distribution of current. Thus in Fig. 7 let it be assumed that section D is pressed downwardly upon the tube A. The pressure is exerted at arrow $a$ in the line of a diameter of the tube—at arrows $b$, $b$ in lines tangent to the tube. As a consequence the metal fused at the outer portions F, F of the recess is not taken up as much as the metal at the middle portion G thereof, with the result that for as long as the current is kept on and the pressure continued, said middle portion is constantly eaten away, so that, as indicated by the dotted line H, a gap is produced between the section and tube; while at the same time, the joints at the outer portions F, F of the recess are poor because of the necessarily small pressure thereat.

As the sole purpose of the transverse sections on the boiler tube is to increase the conducting surface and the union undergoes no strain, it is not essentially necessary that a perfect joint should be made everywhere between tube periphery and section, so long as the connection between the parts is sufficient to insure a proper amount of heat conduction. I find that this is not satisfactorily accomplished under the conditions of Fig. 7, and, therefore, the problem before me has been to devise a way in which a joint of ample conductive capacity can be produced with certainty, and every time. This is the invention herein disclosed. I proceed as follows:

In the plate section to be welded I strike a semi-circular recess I of greater radius than that of the circular cross section of tube A, and on the inner periphery of said recess I produce a number of projections J, J′, which projections, when the section is placed on the tube, contact therewith, substantially as shown in Fig. 1. The welding current being established, the section is pressed against the tube in the direction of the arrow $c$ until the middle projection J′ is eliminated, and in the meantime the other projections are also fused. The conditions are then substantially as shown in Figs. 2 and 4: that is, the fused metal of the projections runs into the spaces K' at the ends of the recess, which would otherwise be open by reason of the difference in curvature of tube and recess, and also is extruded on each side of the section, as indicated at L, Fig. 4. The amount of pressure feed of the section is regulated by the radial length of projection J', and as the operation is stopped as soon as that projection is melted, it is obvious that there is no eating out of the body of the section as there is under the conditions of Fig. 1. I find that this union can be made practically instantly, without any special care in the welding, and that it is always of ample extent to obtain an adequate utilization of the heat conduction of the applied section. The number of projections in the section recess is not material so long as they provide sufficient metal to form said union in the period during which the projection J' is being fused.

I have described my method as applied to the welding of a single half section D. It operates in like manner when the two half sections D, E, similarly formed, are pressed and welded simultaneously upon opposite sides of the tube. The edges N, Fig. 6, of said sections may at the same time, if desired, be welded together.

It is not essential that the projection J which, as I have said, regulates the period of operation, should have its radial direction coinciding with the direction of the pressure; but in all cases the regulation is effected when the projection (the direction of which most nearly approximates the direction of the pressure) is fused.

I claim:

The method of electrically welding a metal plate transversely upon the circumferential periphery of a tube, which consists in, first, forming in an edge of said plate an arc-shaped recess of greater curvature radius than said tube having radial projections which make contact with said tube when said plate is applied thereto; second, placing said plate transversely upon said tube and establishing the welding current while pressing said plate against said tube until the projection having its radial direction most nearly approximating the direction of pressure becomes fused.

In testimony whereof I have affixed my signature in presence of two witnesses.

THOMAS E. MURRAY.

Witnesses:
GERTRUDE T. PORTER,
MAY T. MCGARRY.